United States Patent
Yamada et al.

(10) Patent No.: US 9,626,469 B2
(45) Date of Patent: Apr. 18, 2017

(54) INFORMATION PROCESSING APPARATUS, METHOD OF OUTPUTTING CIRCUIT IMAGE, AND STORAGE MEDIUM STORING CIRCUIT IMAGE OUTPUT PROGRAM

(71) Applicant: FUJITSU LIMITED, Kawasaki-shi, Kanagawa (JP)

(72) Inventors: Shuichiro Yamada, Kawasaki (JP); Motoyuki Tanisho, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/725,294

(22) Filed: May 29, 2015

(65) Prior Publication Data
US 2015/0356724 A1    Dec. 10, 2015

(30) Foreign Application Priority Data
Jun. 6, 2014 (JP) ................................. 2014-117918

(51) Int. Cl.
*G06F 17/50* (2006.01)
*G06F 17/30* (2006.01)

(52) U.S. Cl.
CPC ........ *G06F 17/505* (2013.01); *G06F 17/5068* (2013.01); *G06F 17/30554* (2013.01);
(Continued)

(58) Field of Classification Search
CPC ................. G06F 3/14; G06F 17/30864; G06F 2200/1614; G06F 2203/0382; G06F 2203/04806; G06F 3/048; G06F 17/30554; G06F 17/505; G06F 17/5068; G06F 2217/74; G06F 17/5045; G06F 17/5072; G06F 17/5054
See application file for complete search history.

(56) References Cited

U.S. PATENT DOCUMENTS 5,247,455 A * 9/1993 Yoshikawa ......... G06F 17/5081
716/112
5,247,456 A * 9/1993 Ohe .................. H01L 27/11807
257/E27.108
(Continued)

FOREIGN PATENT DOCUMENTS

JP    2-51777    2/1990
JP    2005-276159    10/2005

*Primary Examiner* — Helen Rossoshek
(74) *Attorney, Agent, or Firm* — Westerman, Hattori, Daniels & Adrian, LLP

(57) ABSTRACT

An information processing apparatus includes a processor and a memory configured to store therein correspondence information defining an association relationship between position of the connection point of circuits and information of wiring which has one end located at the position of the connection point. The processor is configured to identify a first circuit from a group of multiple images representing an overall circuit, acquire, based on the correspondence information, information of a first position of a connection point of a second circuit at which the identified first circuit is coupled and information of a first wiring which one end is located at the first position, extract, from the second image, a partial image that includes images of the first wiring and the connection point at the first position based on the acquired information of the first position and the first wiring, and output the extracted partial image.

17 Claims, 19 Drawing Sheets

(52) U.S. Cl.
CPC ...... *G06F 17/5045* (2013.01); *G06F 17/5054* (2013.01); *G06F 17/5072* (2013.01); *G06F 2217/74* (2013.01)

(56) References Cited

U.S. PATENT DOCUMENTS

| | | | | |
|---|---|---|---|---|
| 5,446,674 A * | 8/1995 | Ikeda | ................ | G01R 31/2646 361/774 |
| 6,161,056 A * | 12/2000 | Sato | ................ | G06F 17/5072 29/829 |
| 6,173,433 B1 * | 1/2001 | Katoh | ................ | G02B 6/12004 716/122 |
| 6,226,778 B1 * | 5/2001 | Konno | ................ | G06F 17/5072 716/122 |
| 6,789,243 B2 * | 9/2004 | Nakagawa | .......... | G06F 17/5072 716/124 |
| 6,859,916 B1 * | 2/2005 | Teig | ................ | G06F 17/5068 257/773 |
| 7,398,497 B2 * | 7/2008 | Sato | ................ | G06F 17/5045 716/112 |
| 7,774,727 B2 * | 8/2010 | Arizono | ............ | G06F 17/5068 716/105 |
| 7,949,982 B2 * | 5/2011 | Ueda | ................ | G06F 17/5068 716/106 |
| 8,316,342 B1 * | 11/2012 | Kukal | ............... | G06F 17/5045 703/13 |
| 8,732,640 B1 * | 5/2014 | Krishnan | ........... | G06F 17/5081 716/110 |
| 2005/0144575 A1 * | 6/2005 | Aoki | ................ | G06F 17/5068 716/123 |
| 2006/0164441 A1 * | 7/2006 | Wada | ................ | G06F 3/0481 345/649 |
| 2008/0109686 A1 * | 5/2008 | Nikaido | ........... | G01R 31/31707 714/57 |
| 2008/0141183 A1 * | 6/2008 | Kumagai | ............ | G06F 17/5045 716/102 |
| 2009/0064077 A1 * | 3/2009 | Uppaluri | ............ | G06F 17/5022 716/119 |
| 2011/0016445 A1 * | 1/2011 | Ueda | ................ | G06F 17/5072 716/111 |
| 2011/0113394 A1 * | 5/2011 | Woods | ............... | G06F 17/5036 716/106 |
| 2012/0110530 A1 * | 5/2012 | Yang | ................ | G06F 17/5068 716/112 |
| 2013/0061194 A1 * | 3/2013 | Handa | ................ | G06F 17/5068 716/122 |
| 2013/0181884 A1 * | 7/2013 | Perkins | ................ | H04N 9/3147 345/1.3 |
| 2014/0131879 A1 * | 5/2014 | Kodama | ............. | G06F 17/5072 257/773 |
| 2015/0185934 A1 * | 7/2015 | Leng | ................ | G06F 3/0412 345/173 |
| 2016/0147930 A1 * | 5/2016 | Iwakura | ............ | G06F 17/5072 716/137 |
| 2016/0154924 A1 * | 6/2016 | Ozawa | ............... | G06F 17/5081 716/115 |

* cited by examiner

FIG. 3

| COMPONENT | LOWER LEFT POINT | UPPER RIGHT POINT |
|---|---|---|
| IC1 | (540, 200) | (600, 800) |
| IC2 | (1280, 200) | (1440, 800) |
| IC3 | (710, 1120) | (790, 1340) |
| OSC1 | (480, 1180) | (520, 1240) |
| C1 | (380, 1200) | (400, 1220) |
| R1 | (420, 1220) | (340, 1240) |
| R3 | (540, 1220) | (580, 1230) |

FIG. 4

| NET | FROM | TO |
|---|---|---|
| SS1 | (480, 500) | (540, 500) |
| SS2 | (480, 490) | (540, 490) |
| SS3 | (480, 480) | (540, 480) |
| SG1 | (600, 400) | (640, 440) |
| SG1 | (640, 440) | (640, 380) |
| AGP | (480, 600) | (520, 600) |
| AGP | (520, 600) | (520, 580) |
| ... | ... | ... |

FIG. 5

| PAGE | COORDINATES |
|---|---|
| 054 | (110, 2220) |
| 055 | (1220, 2100) |
| 056 | (520, 110) |

FIG. 6

| PAGE | DISPLAY REGION | CIRCUIT DIAGRAM DISPLAY REGION |
|---|---|---|
| 054 | (0, 0)–(100, 80) | (900, 400)–(1400, 700) |
| 055 | (0, 0)–(100, 80) | (500, 100)–(550, 105) |
| 056 | (0, 0)–(100, 80) | (2200, 800)–(2500, 900) |
| ... | ... | ... |

FIG. 10

| PAGE | COORDINATES | LINE |
|---|---|---|
| 054 | (110, 2220) | (110, 2220)-(320,2220) |
| 055 | (1220, 2100) | (1220, 2100)-(990, 2100) |
| 056 | (520, 110) | (520, 110)-(1020,110) |

FIG. 12

| PAGE | DISPLAY REGION | CIRCUIT DIAGRAM DISPLAY REGION |
|---|---|---|
| 054 | (0, 0)-(100, 80) | (75, 2185)-(355, 2255) |
| 055 | (0, 0)-(100, 80) | (955, 2065)-(1255,2135) |
| 056 | (0, 0)-(100, 80) | (495, 75)-(1055, 145) |

FIG. 17A

| PAGE | DISPLAY REGION | CIRCUIT DIAGRAM DISPLAY REGION |
|---|---|---|
| 071 | (0, 0)–(100, 80) | (900, 400)–(1400, 700) |
| 072 | (0, 0)–(100, 80) | (500, 100)–(550, 105) |
| 082 | (0, 0)–(100, 80) | (2200, 800)–(2500, 900) |

FIG. 17B

| PAGE | DISPLAY REGION | CIRCUIT DIAGRAM DISPLAY REGION |
|---|---|---|
| 071 | (0, 0)–(100, 80) | (950, 420)–(1100, 500) |
| 072 | (0, 0)–(100, 80) | (500, 100)–(550, 105) |
| 082 | (0, 0)–(100, 80) | (2200, 800)–(2500, 900) |

INFORMATION PROCESSING APPARATUS, METHOD OF OUTPUTTING CIRCUIT IMAGE, AND STORAGE MEDIUM STORING CIRCUIT IMAGE OUTPUT PROGRAM

CROSS-REFERENCE TO RELATED APPLICATION

This application is based upon and claims the benefit of priority of the prior Japanese Patent Application No. 2014-117918, filed on Jun. 6, 2014, the entire contents of which are incorporated herein by reference.

FIELD

The embodiments discussed herein are related to an information processing apparatus, a method of outputting circuit image and a storage medium storing circuit image output program for outputting a circuit image.

BACKGROUND

In recent years, computer aided design (CAD) programs have been used as tools for supporting design. Among the CAD programs, a program that supports the design of electric circuits or electronic circuits uses a computer to design circuits and generate circuit diagrams.

In recent years, circuits have become large and circuit diagrams are each composed of multiple sheets. Thus, multiple sheets are mutually referenced in order to confirm such a circuit diagram, and a task of confirming the circuit diagram is complex.

As a system to be used to reference a circuit diagram, a system for generating information of a link between interested sheets and displaying a sheet of a link destination using the generated link information has been proposed. A related-art document is Japanese Laid-open Patent Publication No. 2005-276159.

In order to confirm the logic of a circuit diagram, a connection relationship between signal lines depicted in sheets, such as a connection relationship between output of a circuit element depicted in a certain sheet and input of a circuit element depicted in another sheet, is referenced. As elements for representing such a connection relationship, signal connectors are used.

By using signal connectors, it is possible to confirm a sheet depicting a signal connector to be connected to a signal connector depicted in another sheet that is currently confirmed. However, if there are a large number of signal connectors to be connected and not all of circuits that include the signal connectors to be connected are to be confirmed in detail, it is inefficient to reference all sheets related to the circuits.

SUMMARY

According to an aspect of the invention, an information processing apparatus includes a processor and a memory configured to store therein correspondence information defining an association relationship between position of the connection point of circuits and information of wiring which has one end located at the position of the connection point. The processor is configured to identify a first circuit from a group of multiple images representing an overall circuit, acquire, based on the correspondence information, information of a first position of a connection point of a second circuit at which the identified first circuit is coupled and information of a first wiring which one end is located at the first position, extract, from the second image, a partial image that includes images of the first wiring and the connection point at the first position based on the acquired information of the first position and the first wiring, and output the extracted partial image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a layout of records of a component management table;

FIG. 4 illustrates an example of a layout of records of a network management table;

FIG. 5 illustrates an example of cross-reference data;

FIG. 6 illustrates an example of a layout of records of a display region setting table;

FIG. 10 illustrates an example of data in which connection destinations SGC are associated with line information;

FIG. 12 illustrates another example of the layout of the records of the display region setting table;

FIGS. 17A and 17B diagrams describing rewriting of the display region setting table due to the enlargement of an image;

DESCRIPTION OF EMBODIMENTS

According to an aspect of embodiments of a circuit image output program disclosed herein, a circuit of a connection destination associated with a signal connector may be easily confirmed. Hereinafter, a circuit image output apparatus (information processing apparatus) disclosed in the specification is described in detail with reference to the accompanying drawings. In the following description, signal connectors represent connection relationships between signal lines depicted in sheets. The signal connectors are arranged at ends of the signal lines depicted. The signal connectors represent that each of the signal lines is connected to another signal line depicted in another sheet. Cross-reference data is information representing an association relationship between a certain signal connector depicted in a certain sheet and another signal connector to be connected to the certain signal connector and depicted in another sheet.

First Embodiment

Figure 1:
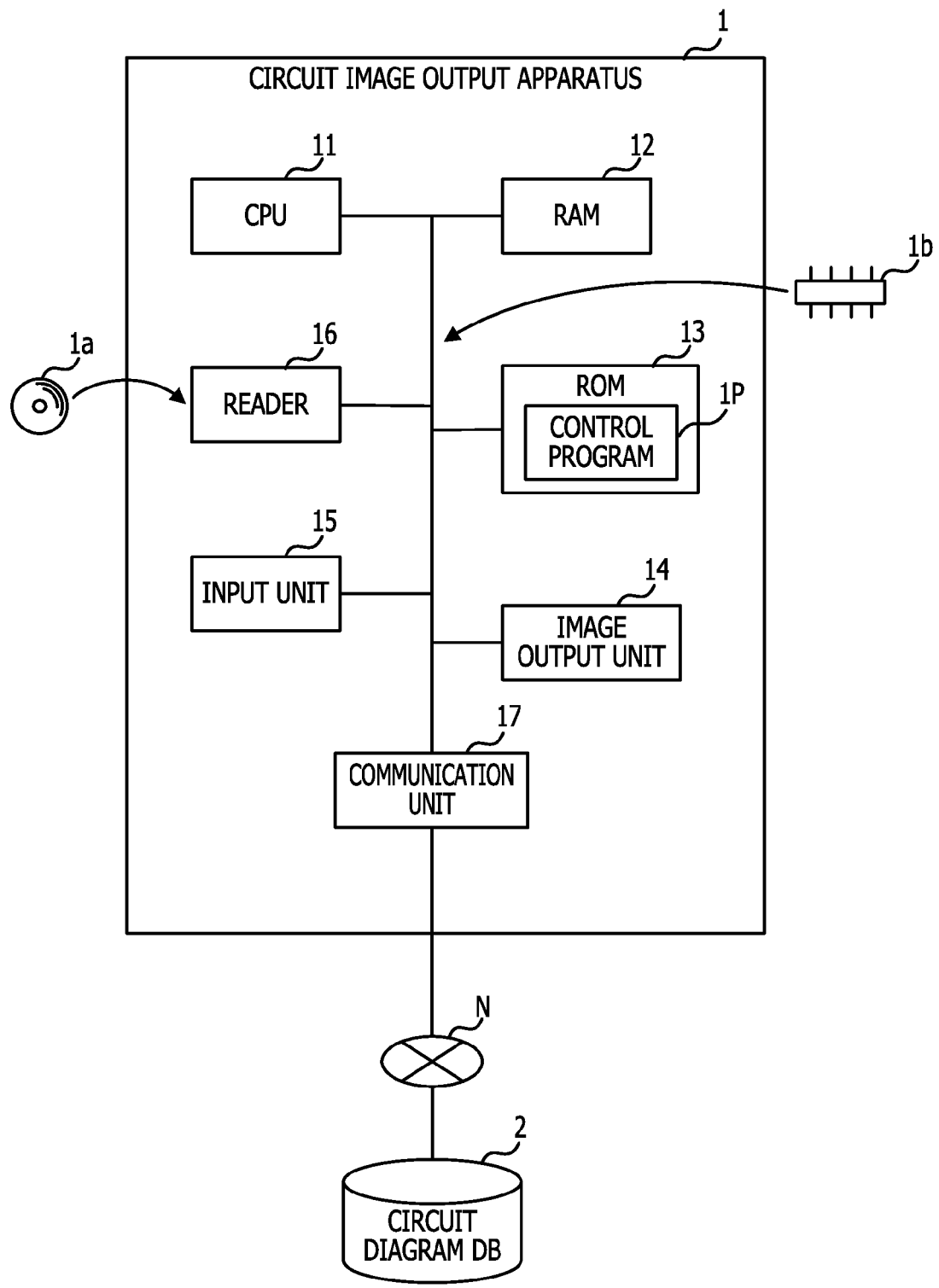
FIG. 1 is a block diagram illustrating an example of a hardware configuration of a circuit image output apparatus.

FIG. 1 is a block diagram illustrating an example of a hardware configuration of a circuit image output apparatus 1. The circuit image output apparatus 1 includes a central processing unit (CPU) 11, a random access memory (RAM) 12, a read only memory (ROM) 13, an image output unit 14, an input unit 15, a reader 16, and a communication unit 17. The constituent units are coupled to each other by a bus.

The CPU 11 controls the hardware units in accordance with a control program 1P stored in the ROM 13. The RAM 12 is, for example, a static RAM (SRAM), a dynamic RAM (DRAM), or a flash memory. The RAM 12 temporarily stores data generated upon the execution of the program by the CPU 11. The image output unit 14 outputs a circuit image to a display device (not illustrated). The input unit 15 receives an operation signal generated by operating an input device (not illustrated) such as a keyboard or a mouse by a user.

The reader 16 reads a portable storage medium is such as a compact disc (CD)-ROM or a digital versatile disc (DVD)-ROM. The communication unit 17 communicates with another computer through a network N. The CPU 11 may read the control program 1P through the reader 16 from the portable storage medium is and cause the control program 1P to be stored in the RAM 12. In addition, the CPU 11 may download the control program 1P from another computer through the network N and cause the control program 1P to be stored in the RAM 12. Furthermore, the CPU 11 may read the control program 1P from a semiconductor memory 1b.

The circuit diagram database (DB) 2 stores various types of data related to circuits. For example, the circuit diagram DB 2 stores arrangement data, a netlist, cross-reference data, and the like.

The circuit image output apparatus 1 may not be configured as a dedicated device and may be configured as a general-purpose computer such as a personal computer or a server computer.

Figure 2:
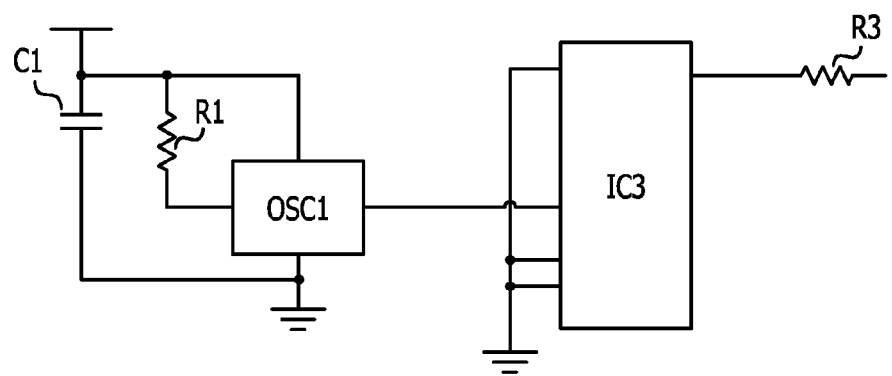
FIG. 2 illustrates an example of a circuit diagram.
Figure 2:
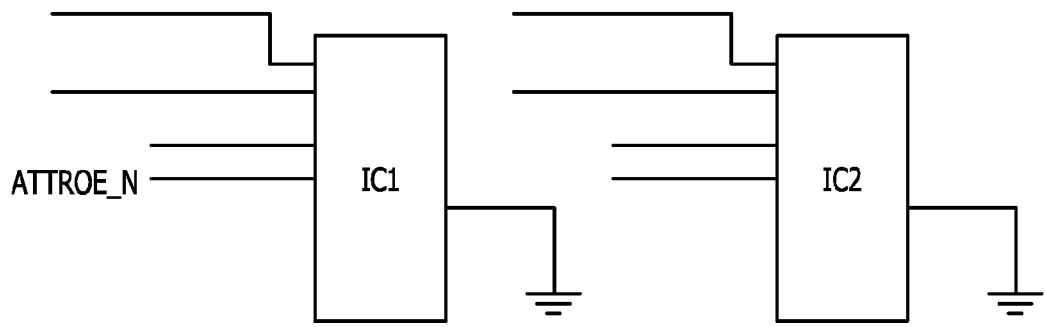

Next, data that is used by the circuit image output apparatus 1 in a process of outputting a circuit image is described. FIG. 2 is a diagram describing an example of a circuit diagram. In the example of FIG. 2, three ICs (IC1, IC2, and IC3), an oscillator (OCS1) 1, two resistors (R1 and R3), and a single capacitor (C1) are illustrated. Signal lines connected to four terminals among terminals of IC1 are connected to signal lines depicted in another sheet. Data of the circuit diagram is data in a bitmap format such as Joint Photographic Experts Group (JPEG), Tagged Image File Format (TIFF), or PNG. The circuit diagram data may be data in a stroke format or a vector format such as Scalable Vector Graphics (SVG) or Windows (registered trademark) Metafile (WMF). The stroke format is a data format representing the outer shapes of graphics by lines. Specifically, data in the stroke format is represented by a combination of coordinates of a start point and coordinates of an end point. The circuit diagram data is stored in the circuit diagram DB 2. It is assumed that coordinate values are set for each sheet that is a unit of display, an axis in a horizontal direction of sheets is X axis, an axis in a vertical direction of the sheets is Y axis, and the origin is a lower left point.

FIG. 3 is an explanatory diagram illustrating an example of a layout of records of a component management table. The component management table stores data of components included in a circuit diagram. The component management table includes a component item, a lower left item, and an upper right item. The component item stores the names of the components. The lower left item and the upper right item store coordinates that represent the positions of the components in the circuit diagram. The names of the components are unique in the single circuit diagram. The component management table is generated upon loading of the circuit diagram data and stored in the RAM 12 or the circuit diagram DB 2.

FIG. 4 is an explanatory diagram illustrating an example of a layout of records of a net management table. The net management table stores data of nets representing connection relationships between signal lines, power supply lines, ground (GND) lines, and the like. The net management table includes a net item, a FROM item, and a TO item. The net item stores the names of the nets. The FROM item stores coordinates of start points of lines (wires) forming the nets, while the TO item stores coordinates of end points of the lines. The names of the nets are unique in a single circuit diagram. The names of the nets, however, are not a main key in the net management table. This is due to the fact that if a single net includes multiple lines, multiple records that include the same net name are stored in the net management table. The net management table is generated upon loading of the circuit diagram data and stored in the RAM 12 or the circuit diagram DB 2.

FIG. 5 is an explanatory diagram illustrating an example of cross-reference data. Data illustrated in FIG. 5 is cross-reference data of a certain signal connector. The cross-reference data includes a page item and a coordinate item. The page item stores page numbers of sheets to be referenced. The coordinate item stores coordinates that represent positions in the sheets to be referenced. FIG. 5 illustrates the example of combinations of numbers, but lattice coordinate names may be used in the example illustrated in FIG. 5. The lattice coordinate names are names provided to cells obtained by dividing each of the sheets, while the cells are like cells of grid sheets. The cross-reference data is stored in the circuit diagram DB 2.

FIG. 6 is an explanatory diagram illustrating an example of a layout of records of a display region setting table. The display region setting table stores settings of display regions for cross-reference data. The display region setting table includes a page item, a display region item, and a circuit diagram display region item. The page item stores page numbers of sheets that are to be cut and displayed and include connection destinations. The display region item stores definitions of regions for displaying circuits of the connection destinations to be connected to signal connectors. In the example illustrated in FIG. 6, the display region item stores coordinates of lower left points of the regions and coordinates of upper right points of the regions and thereby define the sizes of the regions. Since the positions of the regions are not defined by the display region item, the coordinates of the lower left points are (0, 0). The display region item, however, is not limited to this and may define the positions of the display regions by storing coordinates of lower left points. Although the sizes of the regions are the same, the sizes may not be the same and may vary depending on the circuits to be displayed. The circuit diagram display region item stores regions of the sheets that are to be cut and displayed and include the connection destinations. In the example illustrated in FIG. 6, the circuit diagram display region item stores coordinates of lower left points of the regions to be cut and coordinates of upper right points of the regions to be cut. The display region setting table is generated upon reference or edition of a circuit diagram and stored in the RAM 12 or the circuit diagram DB 2.

Figure 7:
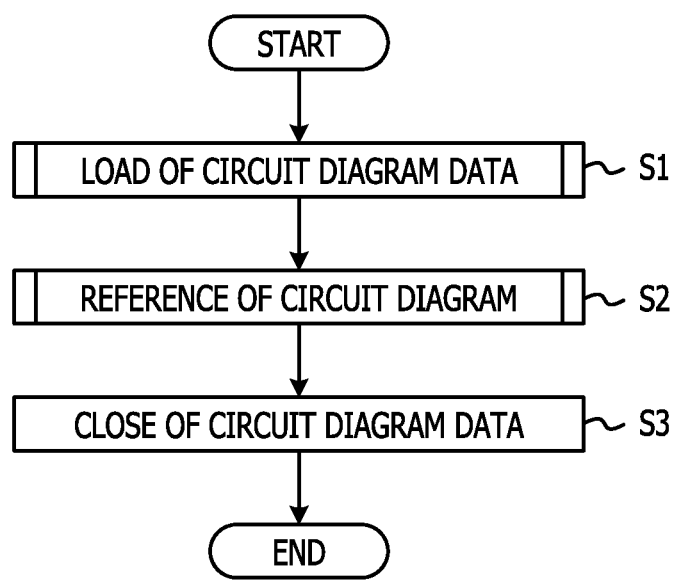
FIG. 7 is a flowchart of an example of a procedure for a process of outputting a circuit image.

Next, a display process to be executed by the circuit image output apparatus 1 is described. FIG. 7 is a flowchart of an example of a procedure for a process of outputting a circuit image. The CPU 11 of the circuit image output apparatus 1 loads data of a circuit diagram specified in accordance with an instruction of the user (in S1). The CPU 11 executes a process of referencing the circuit diagram in accordance with the instruction of the user (in S2). When an instruction to terminate the process is provided by the user, the CPU 11 closes the circuit diagram data and terminates the process (in S3).

Figure 8:
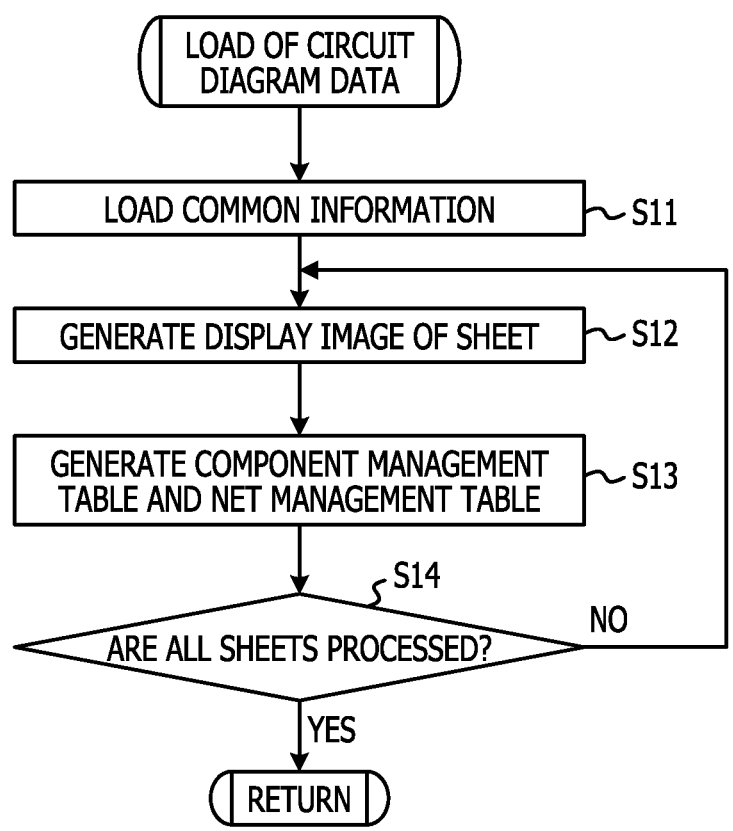
FIG. 8 is a flowchart of an example of a procedure for a process of loading data of a circuit diagram.

FIG. 8 is a flowchart of an example of a procedure for a process of loading the circuit diagram data. The circuit diagram data loading process illustrated in FIG. 8 corresponds to S1 illustrated in FIG. 7. The CPU 11 of the circuit image output apparatus 1 loads common information from the circuit diagram DB 2 (in S11). The common information is arrangement information, types of objects (symbols, nets, and comment graphics), and the like. The CPU 11 selects a sheet to be processed and generates a display image of the selected sheet, based on the loaded common information (in S12). The CPU 11 generates, based on the loaded common information, a component management table and net management table for the sheet to be processed and causes the generated component management table and the generated net management table to be stored in the RAM 12 or the circuit diagram DB 2 (in S13). The component management table and the net management table are described above. The CPU 11 determines whether or not all of sheets are processed (in S14). If the CPU 11 determines that all the sheets are processed (YES in S14), the CPU 11 returns the process to a source from which the process is called. If the CPU 11 determines that an unprocessed sheet exists and not all of the sheets are processed (NO in S14), the CPU 11 causes the process to return to S12.

Figure 9:
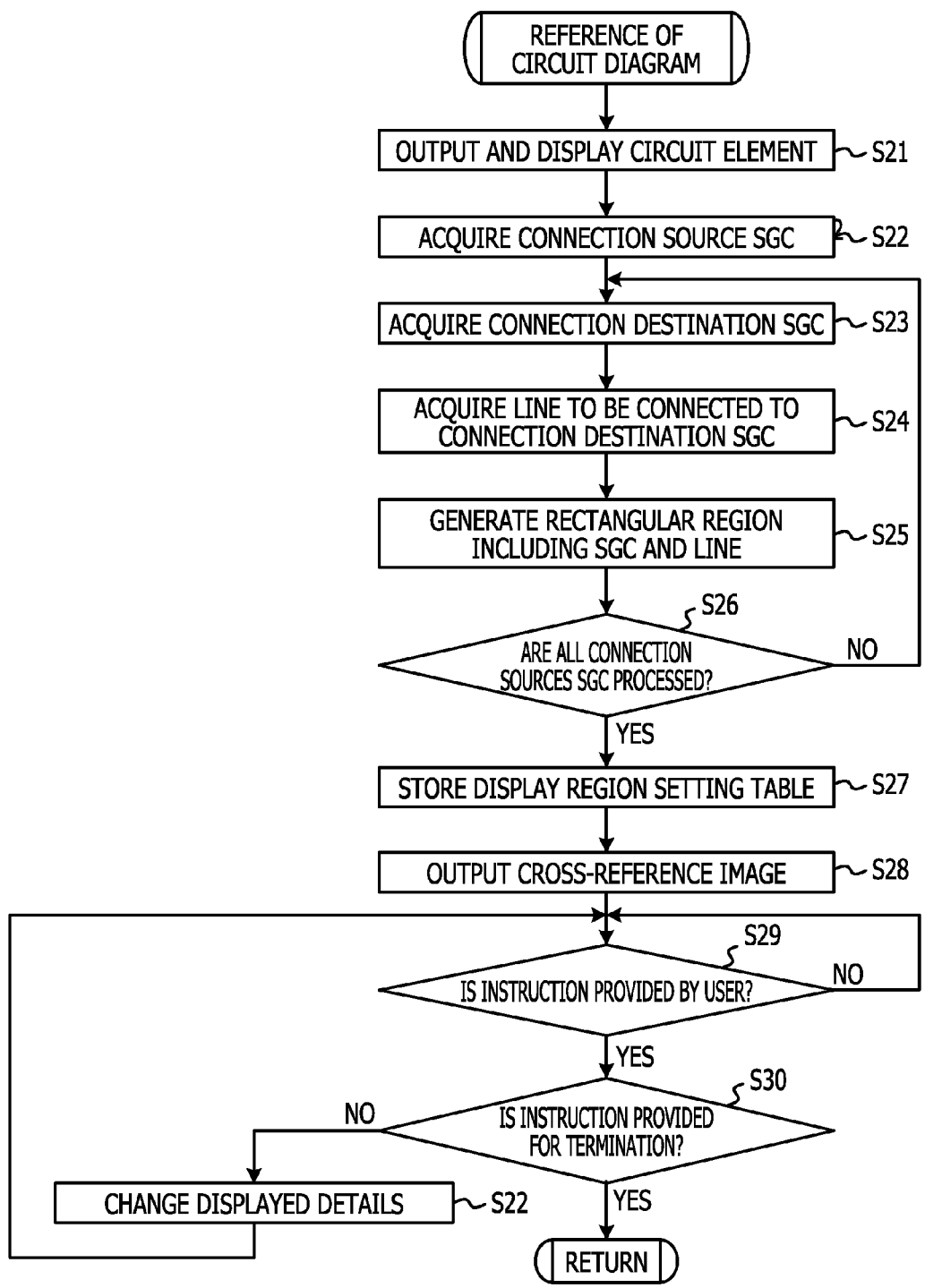
FIG. 9 is a flowchart of an example of a procedure for a process of referencing a circuit diagram.

FIG. 9 is a flowchart of an example of a procedure for the process of referencing the circuit diagram data. The process, illustrated in FIG. 9, of referencing and editing the circuit diagram corresponds to S2 illustrated in FIG. 7. The CPU 11 of the circuit image output apparatus 1 outputs and displays a circuit element included in a sheet specified by the user (in S21). If the circuit diagram includes multiple sheets, the CPU 11 outputs, as images, circuit elements included in the sheets specified by the user. The CPU 11 acquires a signal connector (connection source SGC or connection source) included in the sheet to be displayed (in S22). The CPU 11 acquires a signal connector (connection destination SGC or connection point) included in another sheet and to be connected to the connection source SGC (in S23). Specifically, the CPU 11 searches, from signal connector data (included in the common information) of the overall circuit diagram, a signal connector whose name is the same as the signal connector included in the sheet to be displayed. Among signal connectors found by the search, a signal connector that is included in a sheet other than the sheet to be displayed is the connection destination SGC.

The CPU 11 acquires a line to be connected to the connection destination SGC (in S24). Information of the signal connector and the line to be connected to the signal connector is normally maintained as circuit diagram data and used. The CPU 11 acquires a rectangular region including the acquired connection destination SGC and the acquired line (in S25). Specifically, the maximum X coordinate value, the minimum X coordinate value, the maximum Y coordinate value, and the minimum Y coordinate value are calculated from coordinates of the connection destination SGC and coordinates of both ends of the line or from the coordinates of the three points. From the calculated coordinate values, coordinates of a lower left point of the region including the connection destination SGC and the line and coordinates of an upper right point of the region including the connection destination SGC and the line are calculated. The coordinates of the lower left point are (the minimum X coordinate value, the minimum Y coordinate value), while the coordinates of the upper right point are (the maximum X coordinate value, the maximum Y coordinate value). The CPU 11 generates a predetermined rectangular region including the connection destination SGC and the line based on the coordinates of the lower left point and the coordinates of the upper right point. The CPU 11 causes the coordinates of the lower left point of the generated rectangular region and the coordinates of the upper right point of the generated rectangular region to be temporarily stored in the RAM 12 or the circuit diagram DB 2. The CPU 11 determines whether or not the processes of S22 to S25 are executed on all connection sources SGC (in S26). If the CPU 11 determines that the processes of S22 to S25 are executed on all the connection sources SGC (YES in S26), the CPU 11 causes coordinates of lower left points of temporarily stored rectangular regions, coordinates of upper right point of temporarily stored rectangular regions, page numbers of sheets including the connection sources SGC, and coordinates of lower left points and upper right points of display regions to be stored in the display region setting table (in S27). If the CPU 11 determines that an unprocessed connection destination SGC exists (NO in S26), the CPU 11 causes the process to return to S23.

The CPU 11 outputs a cross-reference image (partial image) based on the display region setting table (in S28). The CPU 11 determines whether or not an instruction is provided by the user (in S29). Specifically, the CPU 11 determines whether or not an operation signal is input to the input unit 15 by a user operation. If the CPU 11 determines that the instruction is not provided by the user (NO in S29), the CPU 11 repeats S29. If the CPU 11 determines that the instruction is provided by the user (YES in S29), the CPU 11 determines whether or not the instruction is provided for termination (in S30). If the CPU 11 determines that the instruction is provided for termination (YES in S30), the CPU 11 returns the process to a source from which the process is called. If the determines that the instruction is not provided for termination (NO in S30), the CPU 11 outputs, from the image output unit, a circuit image of which displayed details are changed based on a detail of the instruction (in S31), and the CPU 11 causes the process to return to S29. The detail of the instruction is an instruction to change the position of a displayed sheet image, an instruction to change the magnification of the displayed sheet image, or the like.

Next, a specific example of the process of outputting a circuit image is described. Since a signal line connected to a terminal ATTROE_N of IC1 illustrated in FIG. 2 is to be connected to another sheet, a certain signal connector is arranged at an end of the signal line. It is assumed that there are three signal connectors (communication destinations SGC) whose names are the same as the certain signal connector and are included in the other sheet and to be connected to the certain signal connector (connection source SGC). It is assumed that reference information that corresponds to the three connection destinations SGC is information illustrated in FIG. 5. The CPU 11 acquires the reference information illustrated in FIG. 5 in the aforementioned step 23. The CPU 11 acquires information of lines connected to the connection destinations SGC. FIG. 10 is an explanatory diagram illustrating an example of data (table) in which the connection destinations SGC are associated with the information of the lines. The information of the lines is added to the records illustrated in FIG. 5. The information of the lines includes coordinate values of both ends of each of the lines.

Figure 11A:
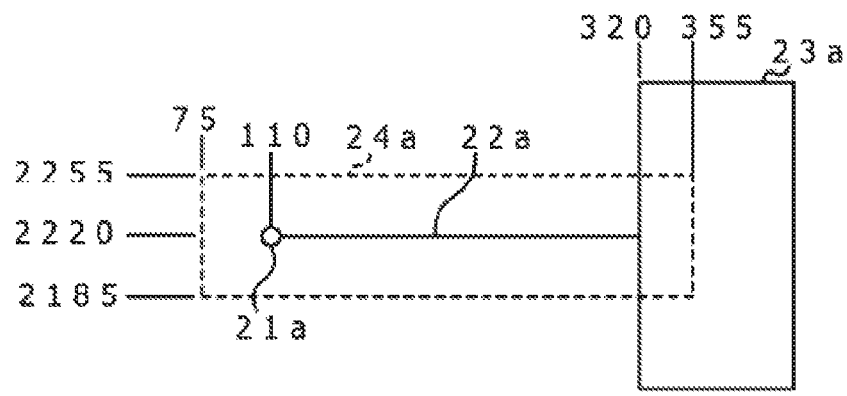
FIGS. 11A, 11B, and 11C are diagrams describing examples of settings of display regions.
Figure 11B:
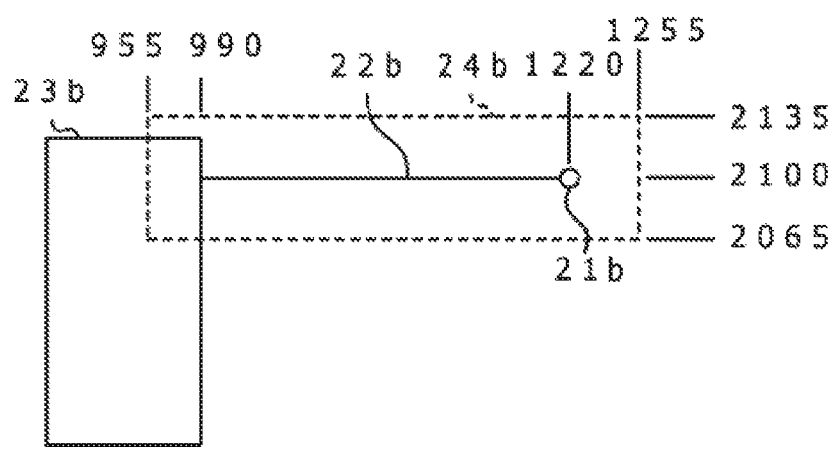
Figure 11C:
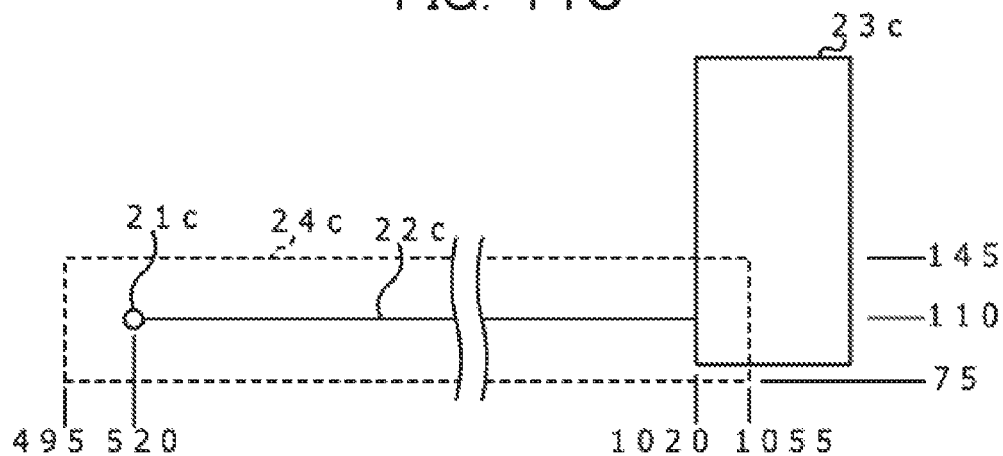

FIGS. 11A, 11B, and 11C are explanatory diagrams illustrating examples of settings of display regions. The display regions are set based on the connection destinations SGC illustrated in FIG. 10 and the information, illustrated in FIG. 10, of the lines connected to the connection destinations SGC. In FIG. 11A, coordinates of a connection destination SGC 21a are (110, 2220), coordinates of an end of a line 22a are (110, 2220), and coordinates of the other end of the line 22a are (320, 2220). The line 22a is connected to a circuit element 23a. Based on the coordinates of the connection destination SGC 21a and the coordinates of the line 22a, coordinates of a lower left point of a display region 24a are set to (75, 2185) and coordinates of an upper right point of the display region 24a are set to (355, 2255). The rectangular display region 24 is set by coordinate values larger by 35 than the maximum X and Y coordinate values and coordinate values smaller by 35 than the minimum X and Y coordinate values.

FIGS. 11B and 11C are similar to FIG. 11A. FIG. 11B illustrates a connection destination SGC 21b, a line 22b connected to the connection destination SGC 21b, a circuit element 23b connected to the line 22b, and a display region 24b. FIG. 11C illustrates a connection destination SGC 21c, a line 22c connected to the connection destination SGC 21c, a circuit element 23c connected to the line 22c, and a display region 24c.

FIG. 12 is an explanatory diagram illustrating another example of the layout of the records of the display region setting table. The display region settings illustrated in FIGS. 11A, 11B, and 11C are represented as the display region setting table. The display region setting table includes the page item, the display region item, and the circuit diagram display region item. The page item stores page numbers of sheets including the connection destination SGC 21c. The display region item stores coordinates defining regions for displaying cross-reference images. The coordinates stored in the display region item are coordinates of lower left points of the regions and coordinates of upper right points of the regions. The circuit diagram display region item stores coordinates defining regions that are included in the sheets including the connection destination SGC 21c and are to be cut and displayed as cross-reference images. The stored coordinates are coordinates of lower left points of the regions to be cut and displayed and coordinates of upper right points of the regions to be cut and displayed. The sizes of the regions to be displayed are defined by defining the coordinates of the lower left points and the coordinates of the upper right points. In the example illustrated in FIG. 12, the sizes of the display regions are fixed, but may be changed based on the sizes of the circuit diagram display regions. The coordinates of the display regions are the same. Thus, if the positions of the display regions are defined by the coordinates, all the display regions overlap each other. In order to avoid this, the display regions do not overlap each other by adding or subtracting certain values to or from the X or Y coordinate values of the display regions or the X and Y coordinate values of the display regions upon the display.

Figure 13A:
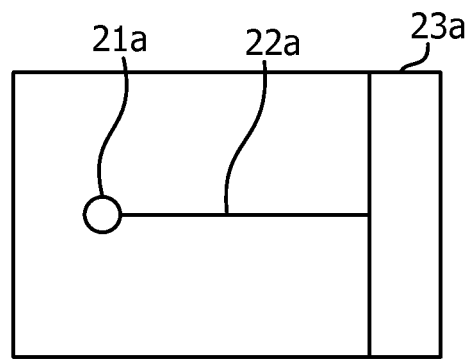
FIGS. 13A, 13B, and 13C illustrate examples of cross-reference images.
Figure 13B:
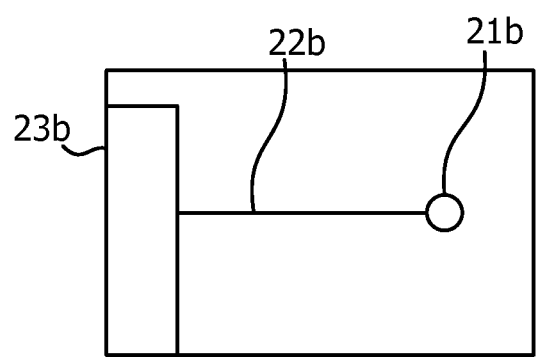
Figure 13C:
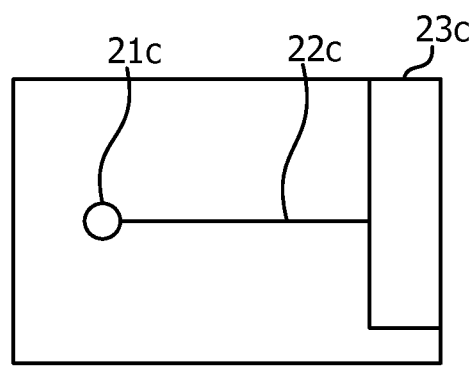
Figure 14:
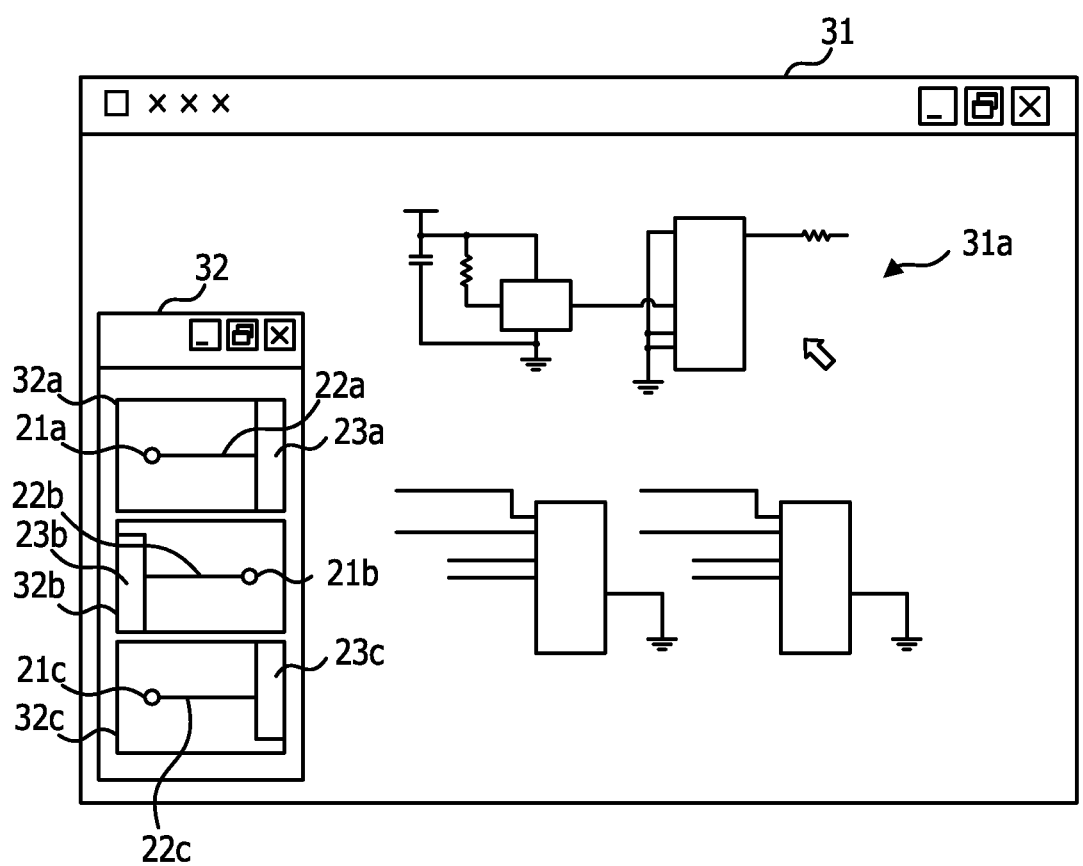
FIG. 14 illustrates an example of an image output from the circuit image output apparatus.

FIGS. 13A, 13B, and 13C are explanatory diagrams illustrating examples of cross-reference images. An image included in the display region 24a illustrated in FIG. 11A, an image included in the display region 24b illustrated in FIG. 11B, and an image included in the display region 24c illustrated in FIG. 11C are illustrated in FIGS. 13A, 13B, and 13C based on the definitions of the display region setting table. FIG. 14 is an explanatory diagram illustrating an example of an image output from the circuit image output apparatus 1. In the example illustrated in FIG. 14, two windows, a first window 31 and a second window 32 are displayed. The circuit diagram 31a illustrated in FIG. 2 is displayed in the first window 31. The cross-reference images 32a, 32b, and 32c illustrated in FIGS. 13A, 13B, and 13C are displayed in the second window 32. As described above, the cross-reference images 32a, 32b, and 32c are displayed so as not to overlap each other.

As described above, in the first embodiment, when a sheet that forms a circuit diagram is displayed, a cross-reference image related to a signal connector included in the sheet is displayed. It is, therefore, possible to easily confirm a circuit to be connected to a signal connector.

Second Embodiment

The circuit image output apparatus 1 according to a second embodiment has a function of zooming in and out a cross-reference image. The difference between the first embodiment and the second embodiment is the function of zooming in and out a cross-reference image and is mainly described below, and a description of the same features as the first embodiment is omitted.

Figure 15:
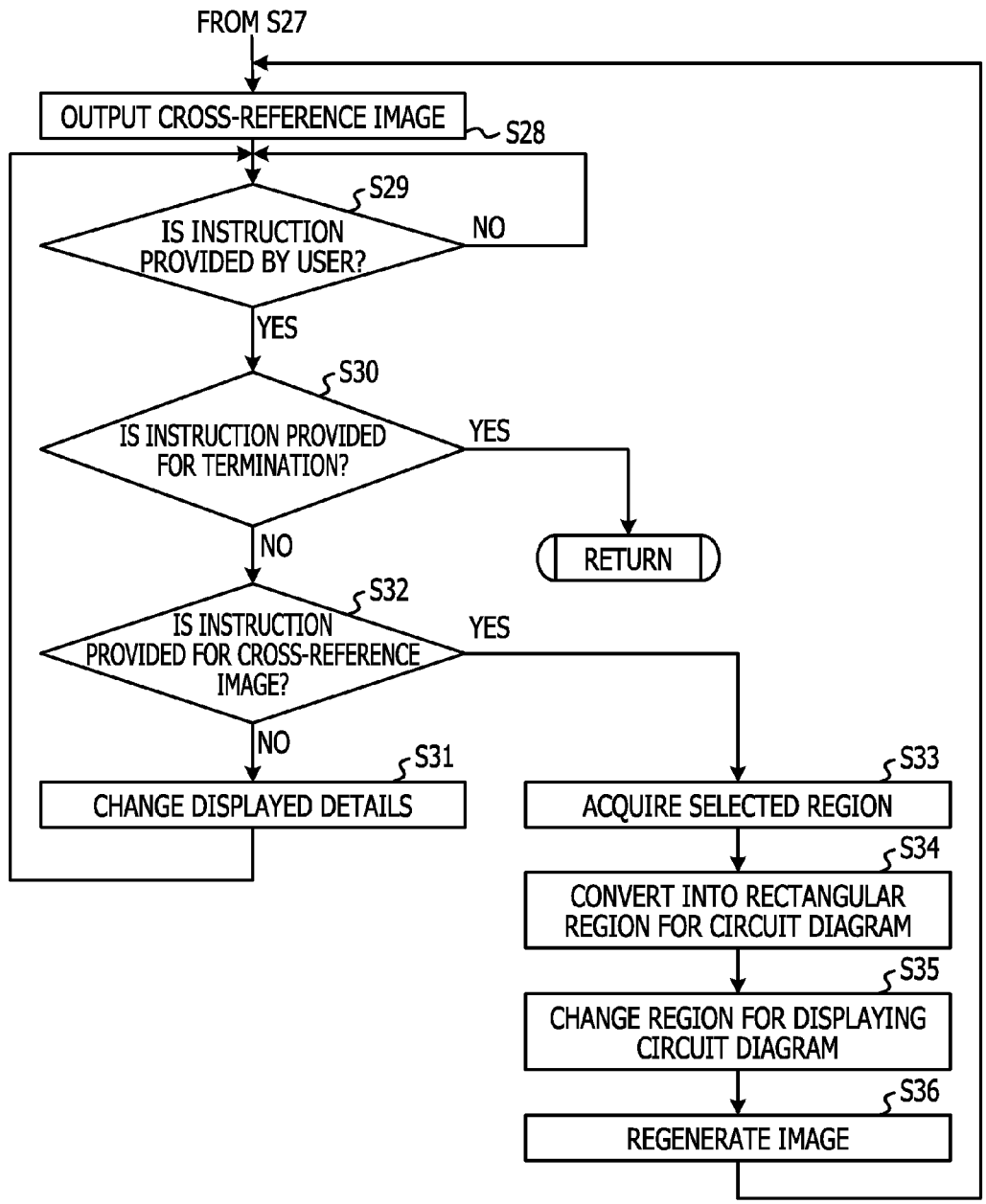
FIG. 15 is a flowchart of an example of a procedure for a process of referencing a circuit diagram according to a second embodiment.

FIG. 15 is a flowchart of an example of a procedure for a process of referencing a circuit diagram according to the second embodiment. A part of the process of referencing a circuit diagram according to the second embodiment is the same as the first embodiment. S21 to S27 illustrated in FIG. 9 are omitted in FIG. 15, while S28 and later are described with reference to FIG. 15. Processes represented by process numbers (S) that are among process numbers (S) illustrated in FIG. 15 and are the same as the process numbers (S**) illustrated in FIG. 9 are the same processes as the first embodiment.

After the CPU 11 outputs the cross-reference image (in S28), the CPU 11 determines whether or not an instruction is received from the user (in S29). If the CPU 11 determines that the instruction is not received from the user (NO in S29), the CPU 11 repeats S29. If the CPU 11 determines that the instruction is received from the user (YES in S29), the CPU 11 determines whether or not the instruction is provided for termination (in S30). If the CPU 11 determines that the instruction from the user is provided for termination (YES in S30), the CPU 11 returns the process to the source from which the process is called.

If the CPU 11 determines that the instruction from the user is not provided for termination (NO in S30), the CPU 11 determines whether or not the instruction is provided for the cross-reference image (in S32). If the CPU 11 determines that the instruction is not provided for the cross-reference image (NO in S32), the CPU 11 changes displayed details of the circuit image based on details of the instruction, outputs the circuit image to the image output unit 14 (in S31), and causes the process to return to S29. If the CPU 11 determines that the instruction is provided for the cross-reference image (YES in S32), the CPU 11 acquires a selected region of the cross-reference image (in S33). The CPU 11 converts the selected region into a rectangular region for the circuit diagram (in S34). Since the cross-reference images are associated with the regions for displaying the circuit diagram in the display region setting table illustrated in FIG. 12, the selected region is converted using the data of the association. The CPU 11 updates the display region setting table based on the converted region for displaying the circuit diagram (in S35). The CPU 11 regenerates the cross-reference image using the updated display region table (in S36). The CPU 11 causes the process to return to S28 and outputs the regenerated cross-reference image (in S28). S28 and later are described above.

Figure 16A:
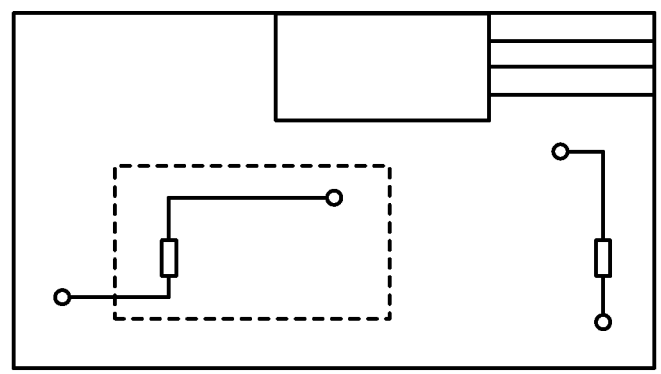
FIGS. 16A and 16B illustrate an example of a zoomed display.
Figure 16B:
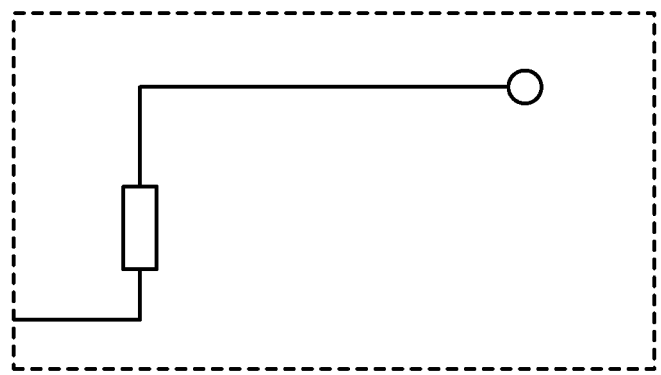

FIGS. 16A and 16B are explanatory diagrams illustrating an example of a zoomed display. FIG. 16A illustrates a cross-reference image before the zoomed display. FIG. 16B illustrates the cross-reference image after the zoomed display. A rectangular image represented by a dotted line illustrated in FIG. 16A is enlarged, as illustrated in FIG. 16B. FIGS. 17A and 17B are diagrams describing rewriting of the display region setting table due to the enlargement of the image. FIG. 17A illustrates an example of the display region setting table before the rewriting. FIG. 17B illustrates an example of the display region setting table after the rewriting. A record for a page number 071 is changed. As illustrated in FIG. 17A, coordinates of lower left and upper right points of a region for displaying a circuit diagram before the change are set to (900, 400) and (1400, 700). Thus, the size of the region for displaying the circuit diagram in X axis direction is 500, and the size of the region for displaying the circuit diagram in Y axis direction is 300. As illustrated in FIG. 17B, coordinates of lower left and upper right points of the region for displaying the circuit diagram after the change is set to (950, 420) and (1100, 500). Thus, the size of the region for displaying the circuit diagram in X axis direction is 150, and the size of the region for displaying the circuit diagram in Y axis direction is 80. Since a region of which the size is smaller than the region before the change is displayed and has the same size as the region before the change, a cross-reference image after the change is obtained by enlarging a part of the cross-reference image before the change.

As described above, in the second embodiment, the function of zooming in and out a cross-reference image is provided, and it is, therefore, possible to confirm a part of the cross-reference image in further detail.

Third Embodiment

The circuit image output apparatus 1 according to a third embodiment has a function of editing a circuit diagram. Specifically, the function is a function of editing an attribute of a circuit element displayed as a cross-reference image. The difference between the first embodiment and the third embodiment is the function of editing a circuit diagram and is mainly described below, and a description of the same features as the first embodiment is omitted.

Figure 18:
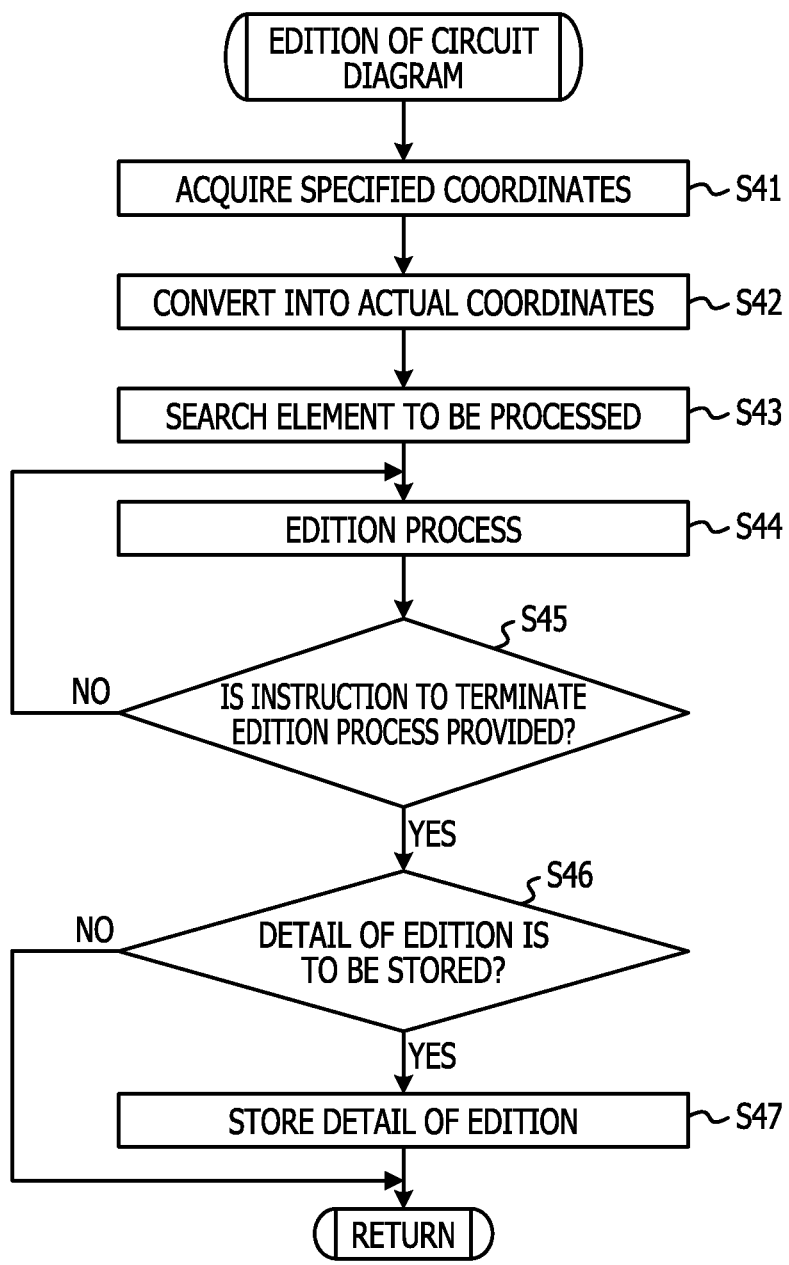
FIG. 18 is a flowchart of an example of a process for a process of editing a circuit diagram.

FIG. 18 is a flowchart of an example of a procedure for a process of editing a circuit diagram. The CPU 11 of the circuit image output apparatus 1 acquires coordinates (specified coordinates) of a position specified by the user within a cross-reference image (in S41). The CPU 11 uses settings of the display region setting table to convert the acquired coordinates into actual coordinates on a sheet that is a source of the cross-reference image (in S42). The CPU 11 uses the actual coordinates to search a circuit element specified by the user in the circuit diagram DB 2 (in S43). The CPU 11 reads, from the circuit diagram DB 2, attribute information of the circuit element found by the search and executes the edition process in accordance with an instruction of the user (in S44). The CPU 11 determines whether or not an instruction to terminate the edition process is provided by the user (in S45). If the CPU 11 determines that the instruction to terminate the edition process is not provided (NO in S45), the CPU 11 causes the process to return to S44 and continues to execute the edition process. If the CPU 11 determines that the instruction to terminate the edition process is provided by the user (YES in S45), the CPU 11 determines whether or not a detail of the edition is to be stored (in S46). If the CPU 11 determines that the detail of the edition is not to be stored (NO in S46), the CPU 11 returns the process to a source from which the process is called. A case where the CPU 11 determines that the detail of the edition is not to be stored is, for example, a case where the user does not edit any detail or a case where although the user edits the detail, the detail of the edition is stored in accordance with an instruction of the user before an instruction for termination. In addition, the case where the CPU 11 determines that the detail of the edition is not to be stored may be a case where the user provides an instruction to avoid storing the changed detail regardless of the fact that an inquiry about whether or not the changed detail is stored is provided to the user. If the CPU 11 determines that the detail of the edition is to be stored (YES in S46), the CPU 11 causes the detail of the edition to be stored (in S47) and returns the process to the source from which the process is called.

The aforementioned process of editing a circuit diagram is called from the circuit diagram reference process illustrated in FIG. 9. If the instruction of the user is determined to be an instruction to execute the edition process in S30, the circuit diagram edition process illustrated in FIG. 18 is executed. If the circuit edition process is executed on information other than attribute information, a sheet to be edited is called and edited.

As described above, in the third embodiment, a circuit element displayed in a cross-reference image may be finely edited by executing the process of editing a circuit diagram, and it is, therefore, possible to omit an operation of reading a sheet to be processed.

In the first to third embodiments, the user may execute the following settings. A display region that is included in a sheet including a connection destination and is to be cut as a cross-reference image is a region including the connection destination SGC and a single line connected to the connection destination SGC, but a region that includes a line connected to the line connected to the connection destination SGC may be treated as the display region. If the number of lines included in the display region is changed from 1 to 2, and the connection destination SGC is connected to a circuit element by the two lines, a part of the circuit element may be included in an image to be cut and used as a cross-reference image.

The user may set a display region item included in the display region setting table and provided for cross-reference images. If some cross-reference images are small and it is hard to see the cross-reference images, the zoom function may be used to enlarge and see the cross-reference images. However, if many cross-reference images are small and it is hard to see the cross-reference images, the enlargement of the cross-reference images makes the user easily see the cross-reference images. Thus, the user may be permitted to change settings of the display region item for cross-reference images and may change the size of a display region. As described above, by permitting the user to change the settings, it is possible to execute display setting based on characteristics of a circuit diagram so as to enable the user to easily see the circuit diagram.

Fourth Embodiment

Figure 19:
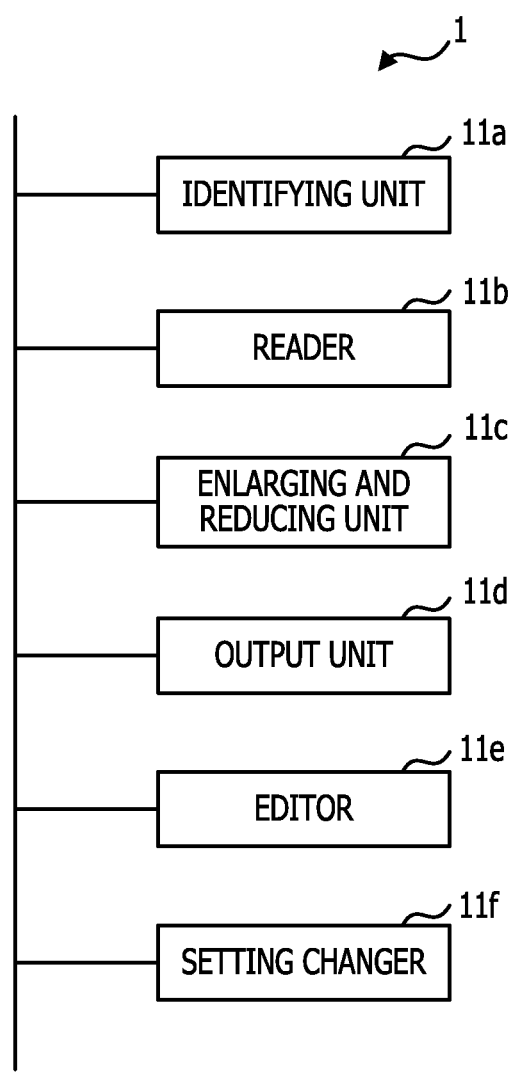
FIG. 19 is a block diagram illustrating an example of a functional configuration of the circuit image output apparatus.

FIG. 19 is a block diagram illustrating an example of a functional configuration of the circuit image output apparatus 1. FIG. 19 illustrates functional blocks of the circuit image output apparatus 1 according to the first to third embodiments. The circuit image output apparatus 1 includes an identifying unit 11a, a reader 11b, an enlarging and reducing unit 11c, an output unit 11d, an editor 11e, and a setting changer 11f. When the CPU 11 executes the control program 1P, the circuit image output apparatus 1 operates in the following manner. The identifying unit 11a identifies a circuit depicted in a single image among a group of multiple images depicting an overall circuit. The reader 11b reads, from a table defining an association relationship between the position of a connection point and information of a wiring of which an end is located at the position of the connection point, information of the position, located on another image, of the connection point that is coupled to the identified circuit element and depicted in the other image and included in another circuit and information of the wiring of which the end is located at the position of the connection point. The enlarging and reducing unit 11c reduces or enlarges a cut partial image to a predetermined display size. The output unit 11d outputs the image (single image) of the identified circuit to be displayed and the cut image. The editor 11e reads attribute information associated with the identified circuit and changes the read attribute information. The setting changer 11f changes display settings of the images. As the display settings, the sizes of reference images to be displayed, the number of lines included in each reference image, and the like are set.

The technical features (configuration requirements) described in the embodiments may be combined, and a new technical feature may be formed by combining at least two of the technical features described in the embodiments.

All the features described in the embodiments disclosed herein are exemplified and may be considered not to be limited. The scope of the embodiments is not indicated by the meaning described above and is indicated in claims and includes meanings equivalent to claims and all changes made within the scope.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory configured to store:
a plurality of images including a first image representing a first circuit which is a part of an overall circuit, and a plurality of second images representing respectively a plurality of connection destinations and a plurality of second circuits which are another part of the overall circuit, and
correspondence information defining an association relationship between position of each of the plurality of connection destinations at which the first circuit and the plurality of second circuits are coupled, and wiring information of wiring which has one end located at the position of each of the plurality of connection destinations; and
a processor coupled to the memory and configured to execute processes comprising:
identifying the first circuit represented by the first image from among the overall circuit;
accepting a selection, previously performed by a user, of a connection point in the first image;
acquiring, based on the correspondence information, position information of a position of one of the plurality of connection destinations in a second image of a second circuit, the one of the plurality of connection destinations in the second image being coupled to the connection point in the first image;
acquiring, based on the correspondence information, the wiring information of a first wiring whose one end is located at the position of the one of the plurality of destination connections;
extracting, from the plurality of second images, a plurality of partial images that are portions of the plurality of second images, the plurality of partial images including area of the first wiring and the plurality of connection destinations based on the acquired position information and the acquired wiring information; and
outputting a circuit image comprising a plurality of extracted partial images along with the first image.

2. The information processing apparatus according to claim 1,
wherein the processes further comprising:
extracting, when the second circuit has the plurality of connection destinations to be coupled to the first circuit, a second partial image including a second connection destination located at a second position on the plurality of second images and a second wiring whose one end is located at the second position, the second connection destination being one of the plurality of connection destinations coupled to the first circuit; and
outputting a circuit image comprising the extracted second partial image along with the circuit image comprising the plurality of extracted partial images along with the first image.

3. The information processing apparatus according to claim 1,
wherein the processes further comprising:
identifying, when the first circuit represented by the first image includes a plurality of connection sources to be coupled to the second circuit, connection destinations, to be coupled to the plurality of connection sources, of the second circuit;
extracting a partial image including the identified connection destinations and wirings whose ends are located at the positions of the connection destinations on the plurality of second images; and
outputting the extracted partial image.

4. The information processing apparatus according to claim 1,
wherein the processes further comprising setting a rectangular range including the connection destination of the second circuit and the wiring as a range of the plurality of partial images to be extracted from the plurality of second images.

5. The information processing apparatus according to claim 1,
wherein the processes further comprising:
reducing or enlarging the plurality of partial images extracted from the plurality of second images to a predetermined display size; and
outputting a plurality of reduced or enlarged partial images.

6. The information processing apparatus according to claim 5,
wherein the processes further comprising reducing or enlarging the plurality of extracted partial images based on an association relationship between the range of the plurality of extracted partial images and the display size.

7. The information processing apparatus according to claim 1,
wherein the processes further comprises outputting a part of the plurality of extracted partial images as an image of the predetermined display size.

8. The information processing apparatus according to claim 1, wherein the plurality of extracted partial images include another wiring to be connected to another end of the wiring.

9. The information processing apparatus according to claim 1,
wherein the processes further comprising:
identifying a circuit element included in the plurality of extracted partial images;
acquiring attribute information associated with the identified circuit element;
changing the acquired attribute information; and
updating the attribute information associated with the identified circuit element based on the changed attribute information.

10. A method of outputting a circuit image from a memory configured to store a plurality of images including a first image representing a first circuit which is a part of an overall circuit, and a plurality of second images representing respectively a plurality of connection destinations and a plurality of second circuits which are another part of the overall circuit, and correspondence information defining an association relationship between position of each of the plurality of connection destinations at which the first circuit and the plurality of second circuits are coupled, and wiring information of wiring which has one end located at the position of each of the plurality of connection destinations, the method comprising:
identifying, by a processor, the first circuit represented by the first image among the overall circuit;
accepting a selection, previously performed by a user, of a connection point in the first image;
acquiring, by the processor, position information of a position of one of the plurality of connection destinations in a second image of a second circuit, the one of the plurality of connection destinations in the second image being coupled to the connection point in the first image;
acquiring, by the processor, based on the correspondence information, the wiring information of a first wiring whose one end is located at the position of the one of the plurality of destination connections;
extracting, by the processor, from the plurality of second images, a plurality of partial images that are portions of the plurality of second images, the plurality of partial images including area of the first wiring and the plurality of connection destinations based on the acquired position information and the acquired wiring information; and
outputting, by the processor, a circuit image comprising a plurality of extracted partial images along with the first image.

11. The method according to claim 10, wherein the method further comprising:
extracting, by the processor, a second partial image including a second connection destination located at a second position on the plurality of second images and a second wiring whose one end is located at the second position when the second circuit has the plurality of connection destinations to be coupled to the first circuit, the second connection destination being one of the plurality of connection destinations coupled to the first circuit; and
outputting, by the processor, a circuit image comprising the extracted second partial image along with the circuit image comprising the plurality of extracted partial images along with the first image.

12. The method according to claim 10, wherein the method further comprising:
identifying, by the processor, connection destinations, to be coupled to a plurality of connection sources, of the second circuit when the first circuit represented by the first image includes the plurality of connection sources to be coupled to the second circuit;
extracting, by the processor, a partial image including the identified connection destinations and wirings whose ends are located at the positions of the connection destinations on the plurality of second images; and
outputting, by the processor, the extracted partial image.

13. The method according to claim 10, wherein the method further comprising:
setting, by the processor, a rectangular range including the connection destination of the second circuit and the wiring as a range of the plurality of partial images to be extracted from the plurality of second images.

14. A non-transitory computer-readable medium storing therein a circuit image output program that causes a computer to execute processes of outputting a circuit image from a memory configured to store a plurality of images including a first image representing a first circuit which is a part of an overall circuit, and a plurality of second images representing respectively a plurality of connection destinations and a plurality of second circuits which are another part of the overall circuit, and correspondence information defining an association relationship between position of each of the plurality of connection destinations at which the first circuit and the plurality of second circuits are coupled, and wiring information of wiring which has one end located at the position of each of the plurality of connection destinations, the processes comprising:
identifying the first circuit represented by the first image among the overall circuit;
accepting a selection, previously performed by a user, of a connection point in the first image;
acquiring position information of a position of one of the plurality of connection destinations in a second image of a second circuit, the one of the plurality of connection destinations in the second image being coupled to the connection point in the first image;

acquiring, based on the correspondence information, the wiring information of a first wiring whose one end is located at the position of the one of the plurality of destination connections;

extracting from the plurality of second images, a plurality of partial images that are portions of the plurality of second images, the plurality of partial images including area of the first wiring and the plurality of connection destinations based on the acquired position information and the acquired wiring information; and outputting a circuit image comprising a plurality of extracted partial images along with the first image.

15. The non-transitory computer-readable medium according to claim 14, wherein the processes further comprising:

extracting, when the second circuit has the plurality of connection destinations to be coupled to the first circuit, a second partial image including a second connection destination located at a second position on the plurality of second images and a second wiring whose one end is located at the second position, the second connection destination being one of the plurality of connection destinations coupled to the first circuit; and outputting a circuit image comprising the extracted second partial image along with the circuit image comprising the plurality of extracted partial images along with the first image.

16. The non-transitory computer-readable medium according to claim 14, wherein the processes further comprising:

identifying, when the first circuit represented by the first image includes a plurality of connection sources to be coupled to the second circuit, connection destinations, to be coupled to the plurality of connection sources, of the second circuit;

extracting a partial image including the identified connection destinations and wirings whose ends are located at the positions of the connection destinations on the plurality of second images; and outputting the extracted partial image.

17. The non-transitory computer-readable medium according to claim 14, wherein the processes further comprising:

setting a rectangular range including the connection destination of the second circuit and the wiring as a range of the plurality of partial images to be extracted from the plurality of second images.

\* \* \* \* \*